United States Patent
Kroell et al.

(10) Patent No.: US 9,267,049 B2
(45) Date of Patent: Feb. 23, 2016

(54) PIGMENT PREPARATION WITH METAL EFFECT PIGMENTS, METHOD FOR THE PRODUCTION OF SAME AND USE OF SAME

(71) Applicant: Eckart GmbH, Hartenstein (DE)

(72) Inventors: Andreas Kroell, Hartenstein (DE); Frank Schaefer, Velden (DE); Dieter Prölβ, Schwabach (DE); Friedrich Dietz, Neunkirchen am Sand (DE); Monika Herold, Plech (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 14/654,806

(22) PCT Filed: Dec. 20, 2013

(86) PCT No.: PCT/EP2013/077736
§ 371 (c)(1),
(2) Date: Jun. 22, 2015

(87) PCT Pub. No.: WO2014/096379
PCT Pub. Date: Jun. 26, 2014

(65) Prior Publication Data
US 2015/0344716 A1    Dec. 3, 2015

(30) Foreign Application Priority Data
Dec. 21, 2012  (EP) .................................... 12199239

(51) Int. Cl.
| | | |
|---|---|---|
| *C09D 11/037* | (2014.01) | |
| *C09C 1/22* | (2006.01) | |
| *C09C 1/40* | (2006.01) | |
| *C09C 1/62* | (2006.01) | |
| *C09C 1/64* | (2006.01) | |
| *C09C 1/66* | (2006.01) | |
| *C09C 3/04* | (2006.01) | |
| *C09C 3/08* | (2006.01) | |
| *C09D 17/00* | (2006.01) | |
| *C08K 9/04* | (2006.01) | |
| *C09D 11/14* | (2006.01) | |
| *C09D 11/107* | (2014.01) | |

(52) U.S. Cl.
CPC ............ *C09D 17/006* (2013.01); *C09D 11/037* (2013.01); *C09D 11/107* (2013.01); *C09D 11/14* (2013.01)

(58) Field of Classification Search
CPC .. C09D 11/037; C09D 17/002; C09D 17/004; C09D 17/006; C09C 1/22; C09C 1/40; C09C 1/62; C09C 1/622; C09C 1/627; C09C 1/64; C09C 1/644; C09C 1/646; C09C 1/66; C09C 3/041; C09C 3/08; C08K 9/04; C01P 2004/20; C01P 2004/61
USPC .......... 106/31.65, 31.67, 403, 404, 456, 460, 106/505
See application file for complete search history.

(56) References Cited

U.S. PATENT DOCUMENTS

| | | | |
|---|---|---|---|
| 3,857,865 A | 12/1974 | Sturwold et al. | |
| 4,116,710 A | 9/1978 | Heikel | |
| 4,321,087 A | 3/1982 | Levine et al. | |
| 5,585,427 A | 12/1996 | Schimmel et al. | |
| 6,398,861 B1* | 6/2002 | Knox | C09D 17/006 106/404 |
| 7,205,351 B2 | 4/2007 | Pritschins et al. | |
| 7,691,933 B2 | 4/2010 | Hupp et al. | |
| 8,157,909 B2* | 4/2012 | Wczasek | C09D 11/037 106/480 |
| 8,333,832 B2* | 12/2012 | Maennig | C09D 17/006 106/31.65 |
| 8,851,649 B2* | 10/2014 | Engel | C09D 11/101 347/100 |
| 2004/0214927 A1 | 10/2004 | Nitzsche | |
| 2006/0111466 A1* | 5/2006 | Bujard | C09C 1/642 523/160 |
| 2007/0199478 A1 | 8/2007 | Schlegl et al. | |
| 2010/0047199 A1 | 2/2010 | Trummer et al. | |
| 2010/0194836 A1 | 8/2010 | Prolss et al. | |
| 2011/0094412 A1 | 4/2011 | Proelss et al. | |
| 2011/0112234 A1 | 5/2011 | Hall-Goulle et al. | |
| 2011/0139034 A1* | 6/2011 | Wczasek | C09D 11/037 106/31.69 |
| 2013/0088553 A1 | 4/2013 | Maennig et al. | |

FOREIGN PATENT DOCUMENTS

| | | |
|---|---|---|
| DE | 2436902 A1 | 2/1975 |
| EP | 1304210 A1 | 4/2003 |
| EP | 1613702 A2 | 1/2006 |
| EP | 2083052 A1 | 7/2009 |
| EP | 2128204 A1 | 12/2009 |
| WO | 9614347 A1 | 5/1996 |
| WO | 2004024837 A1 | 3/2004 |
| WO | 2008077612 A2 | 7/2008 |
| WO | 2009010288 A2 | 1/2009 |
| WO | 2009156275 A1 | 12/2009 |

* cited by examiner

*Primary Examiner* — Helene Klemanski
(74) *Attorney, Agent, or Firm* — The Webb Law Firm

(57) ABSTRACT

The invention relates to a pigment preparation with metal effect pigments, wherein the pigment preparation contains metal effect pigments the average size $d_{50}$ of which lies in a range of from 1.7 to 2.8 μm and the average thickness $h_{50}$ of which lies in a range of from 15 to 50 nm, as well as at least one polycarboxylic acid. In addition, the invention relates to a method for producing this pigment preparation as well as the use of same.

20 Claims, No Drawings

PIGMENT PREPARATION WITH METAL EFFECT PIGMENTS, METHOD FOR THE PRODUCTION OF SAME AND USE OF SAME

CROSS-REFERENCE TO RELATED APPLICATIONS

This application is the United States national phase of International Application No. PCT/EP2013/077736 filed Dec. 20, 2013, and claims priority to European Patent Application No. 12199239.0 filed Dec. 21, 2012, the disclosures of each of which are hereby incorporated by reference in their entireties.

BACKGROUND OF THE INVENTION

1. Field of the Invention

The present invention relates to a pigment preparation with metal effect pigments, wherein the pigment preparation contains metal effect pigments the average size $d_{50}$ of which lies in a range of from 1.7 to 2.8 µm and the average thickness $h_{50}$ of which lies in a range of from 15 to 50 nm, as well as at least one polycarboxylic acid. The invention furthermore relates to the provision of a method for the production of the pigment preparation according to the invention. Finally, the invention relates to the use of the pigment preparation according to the invention in a flexographic ink.

2. Description of Related Art

The use, in an inkjet printing ink, of aluminum effect pigments produced by grinding is known from WO 2009/010288 A2. The $d_{50}$ value lies in a range of from 1 to 15 µm. According to a preferred development, the average diameter, therefore the $d_{50}$ value, of the particles lies in a range of from 2 to 5 µm. The average thickness of the aluminum effect pigments lies in a range of from 15 to 150 nm, preferably from 20 to 80 nm.

It has been shown that the average size distribution of the aluminum effect pigments known from WO 2009/010288 A2 is suitable in particular for use in inkjet printing inks.

Platelet-shaped aluminum pigments, with a narrow thickness distribution, which are at least partially covered with lubricant are known from WO 2008/077612 A2. The average thickness of the platelet-shaped aluminum pigments lies in a range of from 15 to 25 nm. Stearic acid, oleic acid or mixtures thereof are preferably used as lubricant.

In flexographic printing the printing ink is applied to an anilox roller from an ink tank via a fountain roller printing mechanism. Any excess printing ink is scraped off the anilox roller using a doctor blade. The anilox roller transfers the printing ink to a printing cylinder, which then applies the printing ink to the printing substrate guided via an impression cylinder. The printing ink collected from the ink tank is therefore transferred to two further rollers before the ink is printed onto the printing substrate. If printing inks containing metal effect pigments are used, during the transfer of the printing ink from the fountain roller to the anilox roller via the printing cylinder there is a decrease of metal effect pigments in the printing ink during every transfer of printing ink. As a result, the amount of metal effect pigments printed on the substrate to be printed on is insufficient (poor transfer behavior).

The metal pigments described in WO 2008/077612 A2 have a poor transfer behavior. In uses differing from flexographic printing, the aluminum effect pigments obtained by grinding according to the teaching of WO 2008/077612 A2 in contrast display optical properties which come very close to the pigments obtained by physical vapor deposition (PVD). The average size $d_{50}$ of the pigments known from WO 2008/077612 A2 extremely preferably lies in a range of from 15 to 25 µm. These pigments are generally suitable for use in coatings, varnishes, printing inks, powder coatings, etc.

A metal effect pigment with additive is known from EP 2 128 204 A1, wherein the additive is at least partially applied to the metal effect pigment and comprises, as structural units, at least one carboxylic acid with at least four carbon atoms as well as at least one polyglycol ether, wherein the carboxylic acid and the polyglycol ether are covalently bonded to each other.

The additive is suitable in particular as lubricant in the production of metal effect pigments made of metal particles by grinding.

The metal effect pigments known from EP 2 128 204 A1 have an average size $d_{50}$ in a range of from 1 to 200 µm, extremely preferably from 5 to 100 µm. The average thickness $h_{50}$ lies in a range of from 15 nm to 5 µm, extremely preferably from 70 to 150 nm. The metal effect pigments are suitable in particular for use in printing inks.

WO 96/14347 A1 relates to a pigment dispersing additive present as copolymer. The copolymer comprises alternating units of a vinyl monomer and a diester of a dicarboxylic acid, wherein at least one ester group comprises a polyether group and wherein the copolymer has an acid value of less than 1.

WO 2009/156275 A1 relates to a pigment mixture with two different components, wherein one component is platelet-shaped graphite with an average particle size of less than 50 µm and a thickness of less than 100 nm, and wherein a further component is organic or inorganic pigment.

US 2004/0214927 A1 relates to a color concentrate composition for polymeric materials which contains at least one colorant, a compatible polymer, a wax binder and an agent for compounding.

WO 2004/024837 A1 relates to an aqueous pigment paste which is free from binders and friction resins and which contains at least one metal pigment, at least one thickener with non-associative action, at least one organic amine, at least one non-ionic surfactant as well as at least 50 wt.-% water.

SUMMARY OF THE INVENTION

In some examples, there is provided a pigment preparation comprising metal effect pigments, wherein the metal effect pigments have an average size $d_{50}$ in a range of 1.7 to 2.8 µm and an average thickness $h_{50}$ in a range of 15 to 50 nm, as well as at least one polycarboxylic acid, wherein the at least one polycarboxylic acid has at least 4 carbon atoms. Inks, such as fexographic inks, comprising the pigment preparation also are provided.

In some examples, there is provided a method for producing a pigment preparation comprising: grinding metal grit with a $d_{50,grit}$ of 0.6 to 2.4 µm and a $d_{90}$ of 1.6 to 4.3 µm in the presence of at least one polycarboxylic acid, which has at least 4 carbon atoms, with grinding media, obtaining metal effect pigments having an average size $d_{50}$ in the range of 1.7 to 2.8 µm and an average thickness $h_{50}$ in the range of 15 to 50 nm.

DETAILED DESCRIPTION

It has been shown that metal effect pigment preparations suitable for inkjet printing lead to problems in flexographic printing. In particular, the hereby achievable interlaminar strengths of the obtained printed layers are not satisfactory.

The object of the present invention is therefore to provide a metal effect pigment preparation which allows to an excellent transfer of the metal effect pigments from the fountain roller via the anilox roller to the printing cylinder and finally onto the substrate to be printed on when used in a flexographic ink. Furthermore, the flexographic print is to have a good interlaminar strength and preferably is to convey to the observer a very high metal gloss with the appearance of a liquid metal film. The use of the metal effect pigment preparation according to the invention in a flexographic ink is to lead to a very good covering power.

The object of the invention is achieved by providing a pigment preparation with metal effect pigments, wherein the pigment preparation contains metal effect pigments the average size $d_{50}$ of which lies in a range of from 1.7 to 2.8 μm and the average thickness $h_{50}$ of which lies in a range of from 15 to 50 nm, as well as at least one polycarboxylic acid.

Preferred developments of the invention are specified in dependent claims 2 to 12.

According to the invention, by the term "metal effect pigment" or "metal effect pigments" is meant that the metal pigments are flat. Because of their flat structure, metal effect pigments act like tiny mirrors which reflect incident light specularly.

By a flat structure is meant that the ratio of average size $d_{50}$, i.e. the average diameter of the metal effect pigments, to the average thickness $h_{50}$ of the metal effect pigments is at least 34. Preferably, the ratio of the average thickness $d_{50}$ to $h_{50}$, which is also called the aspect ratio, lies in a range of from 34 to 200, further preferably from 40 to 150, still further preferably from 50 to 110.

The pigment preparation according to the invention contains exclusively metal effect pigments the average size $d_{50}$ of which lies in a range of from 1.7 to 2.8 μm and the average thickness $h_{50}$ of which lies in a range of from 15 to 50 nm. In addition to the at least one polycarboxylic acid, of course, further components can be contained, for example additives.

Even if the metal effect pigments are preferably metal effect pigments obtained by wet grinding, the size specifications, for example $d_{10}$, $d_{50}$ and $d_{90}$ values, thickness specifications, for example $h_{50}$ values, and quantity specifications apply, to the effect that the sizes, thicknesses and quantities of all metal effect pigments, independently of preferred variants, in each case also lie within the originally specified ranges, for example in respect of size, thickness and/or quantities, etc.

The inventors have surprisingly ascertained that a pigment preparation the average size of which, therefore the average diameter of the metal effect pigments, lies in an extremely narrow range of from 1.7 to 2.8 μm, and wherein the average thickness $h_{50}$ of these pigments lies in a narrow range of from 15 to 50 nm, is very suitable for use in flexographic printing if the pigment preparation additionally contains at least one polycarboxylic acid.

A flexographic ink which contains the pigment preparation according to the invention surprisingly allows a substantially complete, preferably complete, transfer or transference of metal effect pigments from the fountain roller immersed in an ink tank via the anilox roller to the printing cylinder and finally onto the printing substrate or the substrate. The printing substrate or the substrate is preferably guided via an impression cylinder which interacts with the printing cylinder during the printing process. It is therefore typical of the flexographic printing process that the flexographic ink to be printed is transferred via several rollers, rolls or cylinders before the flexographic ink is printed. In order to obtain a high-quality flexographic print, it is necessary for all components of a flexographic ink to be transferred from a roller, roll or a cylinder onto the respectively next roller, roll or next cylinder such that no decrease of a component in the flexographic ink occurs during the printing process.

For the inventors, it was surprising that, on the one hand, a substantially complete, preferably complete, transfer or transference of the flexographic ink including the metal effect pigments from one roller to the next takes place. Furthermore, it was surprising for the inventors that, although the metal effect pigments do have a very small average size $d_{50}$ of from only 1.7 to 2.8 μm, nevertheless a strongly reflective print can be applied to the printing substrate or substrate and essentially no scattered light effects occur, preferably none at all. The printed pigment preparation preferably has a very high metal gloss with the appearance of a liquid metal film.

In contrast to the metal effect pigments conventionally used in flexographic printing, with average sizes $d_{50}$ of more than 6 μm, usually more than 10 μm, in the case of the metal effect pigments contained in the pigment preparation according to the invention the mirror surface present for reflecting incident light is much smaller. Furthermore, in contrast to conventional metal effect pigments, the proportion of pigment edges in relation to the pigment surface suitable for specularly reflecting incident light is higher in the case of the pigment preparation according to the invention. With a higher edge proportion, a person skilled in the art expects a stronger scattering of incident light and therefore a reduced reflection capacity.

Surprisingly, it has transpired that the pigment preparation according to the invention, after printing by means of flexographic printing, brings about an excellent mirror finish and negligible scattering of incident light.

Although the cause for this astonishing effect has not been established, it is assumed that, because of the almost complete, preferably complete, transfer of metal effect pigments during the printing process from the flexographic ink to the printing substrate or substrate, the metal effect pigments align, after the printing, with the mirror surface substantially parallel to the background of the printing substrate or substrate, wherein the metal effect pigments are arranged against each other or one over another such that the free edges are covered or masked and therefore predominantly, preferably completely, no longer act as scattering centers for incident light.

This assumed effect is presumably promoted by the extremely small size distribution of the metal effect pigments with an average size $d_{50}$ of from 1.7 to 2.8 μm. Because of the extremely small size distribution, in the flexographic printing process the metal effect pigments to be used according to the invention have a very similar transfer or transference behavior from one roller to the next. Furthermore, it is assumed that after application to the printing substrate or substrate, because of the small average thickness $h_{50}$, the metal effect pigments to be used according to the invention can, without substantial disruptions, be arranged against each other and/or one over another or can nestle up against each other, whereby scattered light effects at pigment edges are prevented or suppressed.

Without wishing to be bound to these above assumptions, the inventors have surprisingly established that outside the size and thickness range discovered by the inventors for the metal effect pigments to be used the transfer or transference behavior in flexographic printing deteriorates. Furthermore, the mirror finish after the printing is also impaired if the metal effect pigments lie outside the specified ranges in respect of the average size $d_{50}$ and the average thickness $h_{50}$.

The metal effect pigments can be both PVD pigments, therefore pigments obtained by physical vapor deposition (PVD), and metal effect pigments obtained by grinding metal grit.

PVD metal effect pigments are produced by vapor-deposition of metal vapor onto a, usually linearly movable, substrate. After a metal film with a defined thickness has been obtained, the metal film is detached from the substrate, on which a separation layer is usually arranged. After the metal film has been detached, for example by guiding the substrate vapor-deposited with the metal film through a solvent-containing bath, the detached metal film can be comminuted to form metal pigments with a desired average size. As a rule, this occurs due to the action of a cutting grinder, such as e.g. a Turrax device. Then a concentration can take place, and finally a particular solvent content can be set. PVD metal pigments are commercially available as a dispersion with a metal content of typically from 5 to 20 wt.-%, preferably from 10 to 15 wt.-%. The metal pigments usually have $d_{50}$ values of approx. from 12 to 40 µm and thicknesses of from 15 to 50 nm. The method forming the basis for production has long been known and is described for example in U.S. Pat. No. 4,116,710 A or U.S. Pat. No. 4,321,087 A.

According to a preferred development of the invention, the metal effect pigments according to the invention are produced from metal grit directly by wet grinding. The metal grit preferably has a largely spherical, preferably spherical, geometry in the case of aluminum.

The metal effect pigments used according to the invention, depending on their morphological appearance, as can be seen e.g. from SEM images, can be principally so-called "cornflakes" because of their very rough surfaces. However, the metal pigments have a very small thickness. By cornflakes is meant metal effect pigments which are obtained mainly by comminution grinding and have frayed edges and a relatively rough surface.

It has surprisingly been shown that, in the metal effect pigments to be used according to the invention, after printing in flexographic printing no difference that is distinctly to be perceived by an observer is to be established between metal effect pigments which have a different degree of roughness of the metal effect pigment surface due to the method for producing the metal effect pigments applied in each case.

Thus the optical impression is independent of the various types of metal effect pigments in respect of gloss or the light-dark flop to be observed in metal effect pigments depending on the observation angle when the pigment preparation according to the invention is used in a printed flexographic ink. The optical impression in respect of gloss is therefore also predominant in each case in the metal effect pigments called "cornflakes" after printing in flexographic printing.

It is therefore astonishing that the surface roughness in the case of metal effect pigments the average size $d_{50}$ of which lies in a range of from 1.7 to 2.8 µm and the average thickness $h_{50}$ of which lies in a range of from 15 to 50 nm is without much relevance with regard to the optical perception by an observer of a substrate printed on by means of flexographic printing. The present invention therefore makes it possible for the use of PVD metal effect pigments which have an absolutely planar surface and therefore the greatest mirror finish not to be strictly necessary in the use preferred according to the invention in flexographic printing. Thus, lower-priced metal effect pigments which were obtained by comminution and deformation grinding can also be used in flexographic printing, if they lie within the above-specified size and thickness range, without this being noticeable to the observer of a substrate printed on by means of flexographic printing.

It was furthermore surprising for the inventors that, although the metal effect pigments to be used according to the invention have an extremely small average size $d_{50}$ as well as an extremely small average thickness $h_{50}$, no agglomeration problems occur. The inventors attribute this to the fact that at least one polycarboxylic acid is contained in the pigment preparation as additive. It is assumed that the polycarboxylic acid can apply negative charges to the metal effect pigments via the carboxyl group and these can counteract an agglomeration of the metal effect pigments.

According to a further preferred embodiment, the metal effect pigments have an average thickness $h_{50}$ from a range of from 20 to 40 nm, further preferably from 25 to 38 nm.

The average thickness of the metal effect pigments according to the invention is determined by means of a count of at least 70, preferably of approx. 100 pigment particles with SEM. A method of sample preparation and of evaluation suitable for this is described in detail in paragraphs [0124] to [0128] of EP 1 613 702 B1, which is hereby incorporated by reference. With reference to the thus-ascertained cumulative frequency distribution of the measured pigment thicknesses, the $h_{50}$ value can be calculated for example by means of the "percentile" function in Excel.

Furthermore, it is preferred for the metal effect pigments according to the invention to have an average size $d_{50}$ from a range of from 1.9 to 2.8 µm, further preferably from 2.1 to 2.8 µm.

A size range of the average size $d_{50}$ of from 2.3 to 2.7 µm, still further preferably from 2.4 to 2.6 µm has proved to be very suitable.

The range of from 2.1 to 2.6 µm has proved to be a likewise particularly preferred average size range $d_{50}$ of the metal effect pigments according to the invention. With metal effect pigments, in particular aluminum effect pigments, in this size range, an unexpectedly high interlaminar strength of the printed ink with, at the same time, very good further properties such as gloss, covering power and small grain size was obtained in flexographic printing. These properties bring about the desired optical effect of a liquid metal film ("liquid metal effect").

By the "average" size of the diameter is meant the $d_{50}$ value of the cumulative frequency distribution of the volume-averaged size distribution function.

A size-distribution function can be characterized by determined measured values: $d_{10}$ (measurement for fine fraction), $d_{50}$ (average value) and $d_{90}$ (measurement for the coarse fraction).

The $d_{10}$, $d_{50}$ or $d_{90}$ value of the cumulative frequency distribution of the volume-averaged size-distribution function, as obtained by laser diffraction methods, indicates that 10%, 50% or 90%, respectively, of the pigments have a diameter which is equal to or smaller than the value specified in each case. In the case of platelet-shaped metal effect pigments, the size distribution is here measured by means of laser granulometry according to the manufacturer's instructions, preferably with the Malvern Mastersizer 2000 Application Firmware Version: 1.06 from Malvern Instruments Ltd.

According to the invention, it is furthermore preferred for the metal effect pigment to contain or consist of metal which is selected from the group which consists of aluminum, aluminum alloys, copper, copper alloys and brass and iron.

The metal effect pigment preferably contains or consists of metal which is selected from the group which of aluminum, aluminum alloys, copper, copper alloys and brass.

Aluminum or aluminum alloys have proved to be very suitable.

According to a further variant, copper and copper alloys, such as for example brass, are very preferred. According to a preferred development, the brass, therefore an alloy of copper and zinc, is preferably present in the form of gold bronze, for example as rich gold (approx. 30 wt.-% zinc, approx. 70 wt.-% copper), rich pale gold (approx. 20 wt.-% zinc, approx. 80 wt.-% copper) or pale gold (approx. 10 wt.-% zinc, approx. 90 wt.-% copper).

According to a further variant of the invention, the pigment preparation contains at least one solvent. The solvent is preferably an organic solvent.

Alcohols and substituted alcohols, for example isopropanol, ethanol or methoxy propanol, or acetates, for example ethylacetate or isopropylacetate, or mixtures of these solvents have proved to be very suitable organic solvents.

According to the invention, it is preferred for substantially all surfaces of the metal effect pigments to be provided with the at least one polycarboxylic acid. Preferably, all surfaces of the metal effect pigments are provided with the at least one polycarboxylic acid. The at least one polycarboxylic acid is applied directly to the surfaces of the metal effect pigments. The at least one polycarboxylic acid can be bonded physically and/or chemically to the surface of the metal effect pigment.

The at least one polycarboxylic acid to be used according to the invention is preferably applied to the pigment surface during the grinding or deforming of metal grit or during the comminution of larger metal effect pigments.

The surfaces of the metal effect pigments are therefore preferably completely covered with the at least one polycarboxylic acid. The at least one polycarboxylic acid, for one thing, brings about protection against any corrosive influences, for example after the pigment preparation has been printed, in a flexographic ink, onto a substrate to be printed on.

For another thing, the at least one polycarboxylic acid applied substantially to all surfaces of the metal effect pigments acts as a dispersing additive. As stated above, it is assumed that the negative charges of the carboxyl group or carboxylic acid group counteract an agglomeration of metal effect pigments. In addition, it is assumed that steric effects of the polycarboxylic acid also counteract an agglomeration of the metal effect pigments in the pigment preparation according to the invention.

According to a further variant of the invention, the at least one polycarboxylic acid has at least four carbon atoms and is preferably covalently bonded to at least one polyglycol ether.

It has surprisingly been shown that the at least one polycarboxylic acid with at least 4 carbon atoms, which is preferably covalently bonded to at least one polyglycol ether, is pre-eminently suitable as a lubricant, which is necessary in the production of the metal effect pigments by mechanical deformation of metal grit in order to prevent a cold welding of the deformed pigment. Surprisingly, the metal effect pigments, preferably obtained by mechanical deformation, can be molded to form metal platelets with extremely small thicknesses which have a high gloss.

Furthermore, the at least one polycarboxylic acid to be used according to the invention is also very suitable as a dispersing additive for metal effect pigments. If the pigment preparation according to the invention is present for example in the form of a metal pigment paste and/or a metal pigment filter cake, these can readily be redispersed again. The pigment preparation according to the invention, for example in the form of a paste, has a significantly increased storage stability.

Although it has not yet been explained why the additive preferably used according to the invention, made of polycarboxylic acid and polyglycol ether covalently bonded together, both has a very good lubricating action in the mechanical deformation of metal grit to form metal effect pigments and makes an improved integration or incorporation of the thus-produced metal effect pigments into a flexographic ink possible, it is assumed, without the inventors wishing to be bound to this assumption, that the very good lubricating action is produced by the polycarboxylic acid with at least 4 carbon atoms together with the polyglycol ether.

It is furthermore assumed that the lubricating action is strengthened by a synergistic effect between polycarboxylic acid and polyglycol ether. Here the covalent bond of polycarboxylic acid and polyglycol ether could produce an advantageous spatial proximity, which could be important for the very good lubricating action of this additive.

The good integration or incorporation into an application medium as well as the high storage stability could likewise be to be attributed to the simultaneous presence and the narrow spatial coupling of polycarboxylic acid and polyglycol ether. The polycarboxylic acid(s) are molecules with, if anything, a hydrophobic nature, which have a high affinity for non-polar organic solvents. This is true in particular in the case of longer-chain polycarboxylic acids. The polyglycol ethers are, if anything, of a polar nature and therefore hydrophilic molecules with regard to the oxygen atoms contained in the hydrocarbon chains. They have a very good solubility in a plurality of polar and also non-polar solvents. In particular, they are very water-soluble and therefore are also often to be found in surfactants for aqueous applications. Through the combination of hydrophobic and hydrophilic properties, the metal effect pigments according to the invention can interact with both hydrophobic and hydrophilic components of application media, which is why the metal effect pigments according to the invention presumably are enclosed very well by a flexographic ink and therefore are integrated or incorporated into the application medium without acting as a substantial disruption or as a foreign body.

The good integration or incorporation into the application medium could then also lead to the established improved mechanical resistance in a printed ink layer. Namely, it has surprisingly been shown that the flexographic ink produced using the pigment preparation according to the invention has a high interlaminar strength after printing in flexographic printing and hardening of the printed ink. Therefore, no detachment of the ink layer along the metal effect pigments takes place. Conventional inks containing metal effect pigment, because the metal effect pigments are disruptively flat foreign bodies, can have an undesired cleavability along the arranged metal effect pigments in the hardened or dried ink.

The metal effect pigments to be used according to the invention preferably have a very high covering power because of the very small average thicknesses. Usually, the coverage of a surface area per weight unit of metal effect pigment quantity is called the covering power or covering capacity of a metal effect pigment. The thinner the average thickness of the metal effect pigments is, the larger the surface area covered by the pigment is, i.e. the surface area covered per weight unit of the metal effect pigment, and therefore the covering power of the metal effect pigment.

The small thickness of the metal effect pigments is very advantageous in flexographic printing, as it is presumably also a reason for the excellent transfer or transference behavior from one roller, roll or cylinder to the next.

The pigment preparation according to the invention is characterized by an outstanding brilliance and an excellent specific covering capacity. For example, in the case of aluminum effect pigments with the sizes and thicknesses specified in claim 1, high-gloss silver-colored flexographic prints can be produced. If brass or gold bronze effect pigments with the sizes and thicknesses specified in claim 1 are used, high-gloss gold-colored coatings can be produced in flexographic printing.

According to a preferred embodiment, the metal effect pigments to be used according to the invention in the pigment preparation are not coated further after the mechanical deformation in the presence of the at least one polycarboxylic acid which is preferably covalently bonded to at least one polyglycol ether. The metal effect pigments can therefore be incorporated directly into the application medium for flexographic printing, optionally with a change or removal of the solvent.

Of course, the metal effect pigments contained in the pigment preparation according to the invention can also be coated further and thus the metal effect pigment surface can for example be organically-chemically modified.

According to a preferred embodiment of the invention, the metal effect pigments are non-leafing pigments. By non-leafing metal effect pigments is meant that the metal effect pigments are arranged not against or close to the surface of an applied flexographic ink film, i.e. on the surface of the flexographic ink film facing away from the substrate, but in the flexographic ink film. The metal effect pigments are therefore enclosed by the flexographic ink film, for example binder, and surrounded or embedded when dried or hardened. Thus, the non-leafing metal effect pigments are already protected from mechanical or chemical action by the flexographic ink.

Of course, another protective layer, for example a clear varnish, can also be applied to a coating, applied by means of flexographic printing, based on the pigment preparation according to the invention.

The metal effect pigments in the pigment preparation according to the invention can also be given leafing behavior, for example by additionally applying saturated fatty acids with at least 12 C atoms, preferably palmitic acid or stearic acid, to the pigment surface.

The at least one polycarboxylic acid with at least one covalently bonded polyglycol ether preferably to be used according to the invention can be obtained by reacting polycarboxylic acid and polyglycol ether.

The reaction of polycarboxylic acid and polyglycol ether preferably takes place by esterification and/or amidation.

The covalent coupling of polyglycol ether with the polycarboxylic acid particularly preferably takes place by esterification. Polycarboxylic acid functions here are partially esterified with the polyglycol ether.

For example, polycarboxylic acid and polyglycol can be reacted with each other by conventional esterification reaction, for example by increasing the temperature and removing water. The conditions of such esterification reactions are known to a person skilled in the art and also described for example in EP 1 304 210 A1 or DE 24 36 902, which are hereby incorporated by reference.

The levels of esterification here preferably lie at 10% to 90%, further preferably at 20% to 80% and particularly preferably at 25% to 75%.

According to a preferred development of the invention, an incomplete esterification of the carboxylic acid groups of the polycarboxylic acid therefore takes place, with the result that at least sometimes after the esterification reaction free carboxylic acid groups, preferably at least one free carboxylic acid group per polycarboxylic acid molecule, are still present. Approximately 50% to at most 75% of the carboxylic acid groups are preferably present as free carboxylic acid groups.

According to a further embodiment, the polycarboxylic acid is saturated or unsaturated. However, saturated polycarboxylic acids are preferred, as they bring about a longer storage stability.

The polycarboxylic acid preferably has 6 to 130 carbon atoms, further preferably 8 to 100 carbon atoms, particularly preferably 10 to 96 carbon atoms, and quite particularly preferably 20 to 80 carbon atoms. This number of the carbon atoms relates to the hydrocarbon skeletal structure of the polycarboxylic acids including the carboxylate functions, but not to the polyglycol ether units.

Below 4 carbon atoms in the polycarboxylic acid, the advantageous actions in conjunction with the metal pigment are not recognizable. Above 130 C atoms, the polycarboxylic acid becomes increasingly insoluble in most solvents.

The polycarboxylic acid can be produced from monocarboxylic acids. Saturated fatty acids have proved to be suitable monocarboxylic acids in the present invention for producing the at least one polycarboxylic acid with at least 4 carbon atoms, which is preferably covalently bonded covalently to polyglycol ether. Fatty acids with 6 to 30 carbon atoms, further preferably with 10 to 24 carbon atoms, still further preferably with 14 to 22 carbon atoms are preferably used. Mixtures of various monocarboxylic acids can also be used, in this case the above-named values for the number of the carbon atoms are to be understood as average values of the mixture of several monocarboxylic acids.

The monocarboxylic acids for producing the polycarboxylic acid are preferably selected from the group which consists of valeric acid, caproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, cerotic acid, melissic acid and mixtures of these fatty acids.

According to the invention, unsaturated fatty acids can also be used as monocarboxylic acids with at least 4 carbon atoms. Unsaturated fatty acids with 6 to 30 carbon atoms, further preferably with 10 to 24 carbon atoms, still further preferably with 14 to 22 carbon atoms are preferably used.

The unsaturated monocarboxylic acids for producing the polycarboxylic acid can be selected for example from the group which consists of undecylenic acid, palmitoleic acid, oleic acid, elaidic acid, vaccenic acid, eicosenoic acid, cetoleic acid, erucic acid, nervonic acid, sorbic acid, linoleic acid, linolenic acid, eleostearic acid, arachidonic acid, timnodonic acid, clupanodonic acid, docosahexaenoic acid and mixtures of these fatty acids.

According to a further preferred embodiment, dicarboxylic acids, tricarboxylic acids, tetracarboxylic acids or mixtures thereof are used as polycarboxylic acids. Likewise, saturated and/or unsaturated polycarboxylic acids can be used as di- and/or tricarboxylic acids which can be covalently covalently bonded to polyglycol ether.

For example, succinic acid, glutaric acid, adipic acid, pimelic acid, suberic acid, azelaic acid and/or sebacic acid can be used as dicarboxylic acids.

According to a particularly preferred development of the invention, di-, tri- or tetracarboxylic acids with longer carbon skeletons are used. These di-, tri- or tetracarboxylic acids are preferably obtained by di-, tri- or tetramerization of unsaturated fatty acids, such as the above-specified monocarboxylic acids. The fatty acids used for this preferably have 11 to 30 carbon atoms, further preferably 12 to 24 carbon atoms and still further preferably 14 to 22 carbon atoms. Unsaturated fatty acids suitable for di-, tri- or tetramerization are for example oleic acid, linoleic acid, linolenic acid, eleostearic acid or similar acids.

Although unbranched fatty acids are preferably used to produce the polycarboxylic acid, branched fatty acids can, of course, also be used.

The polycarboxylic acids are particularly preferably present predominantly in the form of dicarboxylic acid.

Monocarboxylic acids with a carbon skeletal structure of 18 carbon atoms have proved to be very suitable for the production of the polycarboxylic acid. This dicarboxylic acid therefore has 36 C atoms and the corresponding tricarboxylic acid has 54 C atoms.

The use of dicarboxylic acids in the reaction with polyglycol and/or polyglycol ether is preferred. Only a partial esterification, with predominantly dicarboxylic acid monoglycol esters being obtained, preferably takes place. A dicarboxylic acid monoglycol ester can for example bond to the metal effect pigment surface via the free carboxylate group and/or counteract an agglomeration of the metal effect pigments via the negative charge of the carboxylate group. The bond to the pigment surface is preferably a covalent bond.

The polycarboxylic acid is preferably a dimerized, trimerized or tetramerized fatty acid. In the case of the fatty acids the above-named fatty acids can be used, which are dimerized, trimerized or tetramerized. Mixtures of these various fatty acids are preferably used.

According to these preferred embodiments of the invention, the at least one polycarboxylic acid has two to eight carboxylic acid groups. The polycarboxylic acid further preferably contains 2 to 4 carboxylic acid groups. These specifications relate to the average values in the case of mixtures of widely different polycarboxylic acids. Approximately 50% to at most 75% of the carboxylic acid groups are preferably unesterified, therefore free carboxylic acid groups.

Furthermore, it is preferred that the polycarboxylic acid contains 10 to 96, preferably 12 to 76, carbon atoms, further preferably 24 to 60 carbon atoms, still further preferably 36 to 54 carbon atoms. Here too, the number of the carbon atoms in the case of mixtures of widely different polycarboxylic acids relates to the average number within this mixture.

A dimerized or trimerized fatty acid is preferably used, which preferably has 30 to 60 carbon atoms, further preferably 36 to 54 carbon atoms. A dimer acid with an average of 36 carbon atoms has proved to be very suitable. The dimer acid can preferably also contain trimer acid or monoacid or tetramer acid in certain proportions.

Corresponding polycarboxylic acids are commercially available under the trade names Empol (from Cognis, Adhesives & Sealants) or Pripol (from Unichema) or Versadyne (Henkel Hakusui Kabushiki Kaisha).

Examples of these are: Empol 1018, Empol 1045, Pripol 1013, Pripol 1006, Pripol 1022, Pripol 1009, Pripol 1010, Pripol 1040, Pripol 1010, Versadyme 216.

According to a preferred development of the invention, the polyglycol ether comprises the group

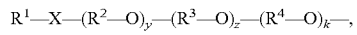

wherein the $R^2$—O, $R^3$—O and the $R^4$—O polyether units can be arranged statistically, alternating or as block copolymers. The radical $R^1$ is a linear or branched aliphatic radical or araliphatic or aromatic organic radical with 1 to 30 carbon atoms. The radicals $R^2$, $R^3$ and $R^4$ can be the same or different independently of each other and in each case represent a linear or branched aliphatic organic radical or araliphatic or aromatic organic radical with 1 to 12 carbon atoms. The individual polymerization levels y, z and k are natural numbers and independently of each other represent 0 to 200, provided that y+z+k=2 to 600. The group X represents O, S, (C=O)O, NR, wherein R is the same as H or is an aliphatic radical with 1 to 20 carbon atoms. Here, X is preferably an oxygen atom or a carboxy function and particularly preferably an oxygen atom.

The polyglycol ether used for covalent coupling with the carboxylic acid is preferably obtained by reacting an $R^1$—OH alcohol, an $R^1$—SH thiol, an $R^1$—COOH carboxylic acid or an $R^1$NHR amine as starter molecules with in each case an excess of glycols under suitable reaction conditions known to a person skilled in the art.

The polyglycol ethers used according to the invention for covalent coupling with the at least one polycarboxylic acid are largely present as monofunctional polyglycols, because these can clearly be covalently coupled with the carboxylic acids. By "largely monofunctional" is meant here that they also have a proportion of bifunctional polyglycol ether of from 0 to at most 10%. In this case, either the radical $R^1$ contains a group that can react with the carboxylic acid or, instead of the radical $R^1$, a hydrogen atom is present. The latter case for example is to be attributed to an incomplete reaction of the alcohols, thiols, etc. with the glycols.

The radical $R^1$ is preferably a linear or branched aliphatic radical or araliphatic or aromatic organic radical with 2 to 16 carbon atoms and particularly preferably an aliphatic radical with 1 to 12 C atoms.

The radicals $R^2$, $R^3$ and $R^4$ preferably independently of each other have 2 to 8 C atoms and particularly preferably 2 to 4 C atoms.

The radicals $R^2$, $R^3$ and $R^4$ are particularly preferably independently of each other ethyl, isopropyl, propyl or butyl. Alternating or block copolymer-like ethyl, isopropyl units, so-called EO/PO polyethers are further particularly preferred.

The length of the ether units y+z+k is preferably 5 to 300, further preferably 7 to 100 and particularly preferably 10 to 50.

If the ether units are too long, the affinity of the at least one polycarboxylic acid which is covalently bonded to the at least one polyglycol ether for the metal effect pigment surface can decrease. In this case, it could happen that, in particular in a paste or a finished application medium of a flexographic ink, the at least one polycarboxylic acid which is covalently bonded to the at least one polyglycol ether detaches from the metal effect pigment or, possibly, does not bind sufficiently to the pigment surface during the grinding process.

Examples of suitable polyglycol ethers that can be covalently bonded to the at least one polycarboxylic acid are methoxy polyethylene glycols, butoxy polyethylene glycols, methoxy polypropylene glycols or butoxy polypropylene glycols.

Before the coupling to the at least one polycarboxylic acid, the at least one polyglycol ether or the polyglycol usually has a hydrogen atom or an amine function or an epoxide at the open end of the structural formulae shown above. Therefore, before the reaction with the carboxylic acid, the following molecules are preferred:

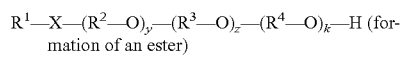
(formation of an ester)

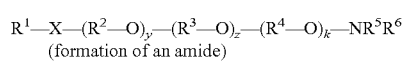
(formation of an amide)

(formation of an α-hydroxy ester)

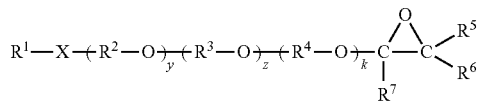

In the above structural formulae, $R^5$, $R^6$ and $R^7$ are independently of each other preferably H or a branched or unbranched carbon radical with 1 to 6 carbon atoms. The carbon radical is preferably a linear alkyl radical with 1 to 6 carbon atoms. The carbon radicals $R^5$, $R^6$ and $R^7$ can independently of each other be saturated or unsaturated. For example, $R^5$, $R^6$ and $R^7$ can independently of each other represent phenyl radical. Particularly preferably $R^7$ and $R^5$ are H and $R^6$ is H or methyl.

After reaction of the polyglycol ether with the carboxylic acid, a covalent coupling preferably takes place via the terminal oxygen atom.

According to a further variant, the carboxylic acid is partially or completely esterified or amidized.

It has surprisingly been shown that it is particularly advantageous if only some of the carboxyl groups are esterified, therefore the at least one polycarboxylic acid(s) is present as partial ester. At least 10% and at most 90% of the carboxyl groups are preferably esterified. Furthermore preferably approximately 15 to 80%, still further preferably approximately 20 to 70% of the carboxyl groups are esterified. The non-esterified carboxylic acid groups or carboxyl groups are therefore present as free carboxylic acid groups or free carboxyl groups.

Approximately 50% of the carboxylic acid groups per polycarboxylic acid molecule are extremely preferably esterified. Thus, approximately 50% to at most 75% of the carboxylic acid groups per polycarboxylic acid molecule are preferably present as free carboxyl groups or carboxylic acid groups.

For the coupling to the metal effect pigment surface, preferably only a few carboxyl groups are necessary in the additive made of at least one polycarboxylic acid, which is preferably covalently bonded to at least one polyglycol ether.

It has been shown that the storage stability as well as the mechanical properties, in particular the interlaminar strength, of a dried or hardened flexographic ink improve when the at least one polycarboxylic acid(s) is present as partial ester.

Therefore, in this preferred variant, a part of the at least one polycarboxylic acid with free carboxyl functions is still present. It is assumed that the additives with such carboxyl functions of the mixture according to the invention can bond particularly well to the metal pigment surface.

The at least one polycarboxylic acid, after the covalent bonding to the at least one polyglycol ether, preferably has acid numbers of from 5 to 140 KOH/g additive, further preferably 6 to 100 mg KOH/g additive and particularly preferably from 8 to 50 KOH/g additive. These acid numbers are preferably ascertained according to DIN 53402.

According to a further variant of the invention, the covalent coupling of the at least one polycarboxylic acid and polyglycol ether does not take place via an esterification or an amidation of the carboxyl functionalities of the carboxylic acid.

In this variant, for example the at least one polycarboxylic acid has one or more hydroxy functions (for example tartaric acid) and is reacted with a polyglycol ether which has a terminal epoxide group. In the polycarboxylic acid, the free carboxyl functions are protected by suitable protecting groups, with the result that no reaction with the epoxide group takes place and with the result that the polyglycol ether is covalently coupled by means of its epoxy function with the hydroxy function(s) of the polycarboxylic acid, forming an α-hydroxy ether bond.

According to a further variant of the invention, the at least one polycarboxylic acid and the at least one polyglycol ether can be coupled with each other via a hydrocarbon radical. This hydrocarbon radical can be saturated or unsaturated and preferably comprises 2 to 100 C atoms. Furthermore, it is preferred for the hydrocarbon radical to comprise 4 to 50, still further preferably 6 to 20 carbon atoms. Extremely preferably, the hydrocarbon radical has a chain length in the range of from 2 to 10 carbon atoms. The hydrocarbon radical can contain oxygen atoms and/or be substituted. The hydrocarbon radical is preferably straight-chained, but can also be branched. In order to bring about a covalent bonding of carboxylic acid and polyglycol ether, these are reacted with a bifunctional reactive hydrocarbon. In the case of the reactive organic groups, the above-named reactive organic groups can be used which are bonded to each other via a spacer group (spacer). The spacer group can be an alkyl radical or an alkoxyalkyl radical with the above-specified number of carbon atoms. According to a preferred variant, diglycidyl compounds, preferably diglycidyl ether, are used.

In preferred embodiments, the at least one polycarboxylic acid which is covalently bonded to at least one polyglycol ether has a predefined ratio of hydrophilic polyether radicals and hydrophobic hydrocarbon skeletons of the polycarboxylic acid(s). For example, the ratio of the length of the polyether units y+z+k (level of polymerization) to the number of the carbon atoms of the polycarboxylic acid is preferably 0.1 to 4.0, further preferably 0.15 to 3.0, particularly preferably 0.2 to 2.0 and quite particularly preferably 0.25 to 1.0.

Below a ratio of 0.1, it can be the case that the polyether unit no longer displays an action. Likewise, above a ratio of 4.0, no further advantages can be observed. In this case, it can be the case that the at least one polycarboxylic acid which is covalently bonded to the polyglycol ether no longer is or becomes reliably bonded to the metal effect pigment surface.

According to a further variant, the polycarboxylic acids can also be partially esterified with monofunctional alcohols. The level of esterification of the monofunctional alcohols is preferably 0 to 50% of the carboxylic acid functions present. The monofunctional alcohols contain a hydrocarbon radical with 1 to 20 C atoms. The hydrocarbon radical can be straight-chained or branched and can be saturated or unsaturated. Examples of suitable alcohols are: isopropanol, butanol, t-butanol, amyl alcohol, isoamyl alcohol, n-hexanol, 2-ethylhexane, myristyl alcohol, n-octanol, isooctanol, isodecanol, capryl alcohol, lauryl alcohol, stearyl alcohol, tridecyl alcohol, hexadecyl alcohol as well as mixtures of these alcohols.

The average molecular weight of the at least one polycarboxylic acid which is used according to the invention on the metal effect pigments and is bonded to at least one polyglycol ether preferably lies in a range of from 200 to 20000 g/mol, further preferably from 300 to 10000 g/mol. An average molecular weight range of from 500 to 8000 g/mol has proved to be very suitable and a molecular range of from 1000 to 4000 g/mol is particularly preferred.

According to a further variant of the invention, the polycarboxylic acid is present partially or completely as polycarboxylic acid salt.

The polycarboxylic acid salts can contain alkali and/or alkaline earth cations as cations. Preferred The cations of the polycarboxylic acid salts are preferably $Li^+$, $Na^+$, $K^+$, $Mg^{2+}$ and/or $Ca^{2+}$ as well as mixtures thereof.

The polycarboxylic acid salt is preferably a salt from the carboxylate of polycarboxylic acid and one or more metal cation(s), wherein the metal cations are preferably selected from the metals which are contained in the metal core of the metal effect pigment.

It has transpired to be advantageous, if polycarboxylic acid salts, for example metal soaps, are used, to select those the cation(s) of which correspond to the metal or the metals of the metal effect pigment, in order not to introduce unnecessarily additional ions into an application medium.

According to a preferred variant, the metal cation or metal cations of the polycarboxylic acid salt are selected from the group of the monovalent, divalent and/or trivalent metal cations.

Preferred cations are therefore $Al^{3+}$, $Fe^{3+}$, $Fe^{2+}$, $Cu^{2+}$ and/or $Zn^{2+}$.

These polycarboxylic acid metal salts can also be formed in-situ from the polycarboxylic acids which are applied to the metal pigments. The polycarboxylic acids can, over time, react with the metal pigment, forming the metal soap. This behavior is also known of the fatty acids usually used as lubricants, such as for example stearic acid or oleic acid.

According to a preferred embodiment, the at least one polycarboxylic acid which is preferably covalently bonded to at least one polyglycol ether is used as lubricant for the grinding of the metal pigments. According to a further preferred embodiment, no further additions of saturated or unsaturated fatty acids such as stearic or oleic acids are added to this lubricant.

It has been shown that the advantageous actions of the additive to be used according to the invention, i.e. the at least one polycarboxylic acid which is preferably covalently bonded to at least one polyglycol ether, are impaired by the addition of conventional fatty acids during the grinding.

According to a further advantageous development of the invention, the pigment preparation is present in compacted form, preferably as granulate, pellets, tablets, briquettes, sausages or as paste.

The pigment preparation in compacted form preferably has a residual moisture content of up to approximately 15 wt.-%, further preferably of from approximately 1 to approximately 10 wt.-%, still further preferably of from approximately 3 to approximately 8 wt.-%, wherein the wt.-% specification is relative to the total weight of the compacted metal effect pigment preparation.

The pigment preparation according to the invention is particularly preferably present in the form of a pigment paste with a solvent content from a range of 30-80 wt.-%, relative to the pigment paste.

The above-named dosage forms make a low-dust, preferably dust-free, handling of the pigment preparation according to the invention possible. The pigment preparation can be easily transported, metered out and processed without there being a danger for humans and the environment. In particular, the pigment preparation according to the invention in the compacted form can be easily and reliably introduced into a flexographic ink. The compacted pigment preparation is dispersed in the flexographic ink by simply being stirred in.

According to a further variant, the preparation according to the invention additionally contains at least one dispersing additive structurally different from the polycarboxylic acid.

The dispersing additive additionally present according to a development of the invention according to the invention is preferably essentially not bonded to the pigment surface. Although this additional dispersing additive can also partially adhere to pigment surfaces of the metal effect pigments, the additionally used dispersing additive is present, according to a preferred development of the invention, essentially unbonded between the metal effect pigments. This additional dispersing additive facilitates a redispersion of the pigment preparation according to the invention and therefore likewise counteracts an agglomeration of metal effect pigments.

For example, polymers with acidic groups can be used as additional dispersing additive. The acidic groups can be for example the sulfate group, sulfonic acid group, phosphate group, phosphonic acid group and mixtures thereof.

The acid number of the additional dispersing additive preferably lies in a range of from 70 to 180 KOH/g, further preferably from 110 to 150 KOH/g.

The amine number of the additional dispersing additive additionally preferably lies in a range of from 40 mg/KOH/g to 120 mg/KOH/g, further preferably from 60 to 80 mg/KOH/g.

Examples of commercially available dispersing additives are Solsperse 20000, 24000, 3000, 32000, 32500, 33500, 34000 and 35200 (Avecia K.K.) or Disperbyk-102, 106, 111, 161, 162, 163, 164, 166, 180, 190, 191 and 192 (BYK-Chemie GmbH 46462 Wesel, Germany) or mixtures thereof. In particular Disperbyk-106, Disperbyk-102 or Disperbyk-190 have proved to be very suitable to be used in combination with the at least one polycarboxylic acid which is preferably covalently bonded to at least one polyglycol ether.

According to the invention, it is further preferred for the metal effect pigments used in the pigment preparation to have a cumulative frequency distribution with a $d_{50}$ value in a range of from 2.1 to 2.8 μm and a $d_{90}$ value in a range of from 4.0 to 8.0 μm.

According to the invention, it is still further preferred for the metal effect pigments used in the pigment preparation to have a cumulative frequency distribution with a $d_{50}$ value in a range of from 2.3 to 2.6 μm and a $d_{90}$ value in a range of from 4.5 to 6 μm.

The cumulative frequency distribution of the metal effect pigments is measured by means of laser granulometry according to the manufacturer's instructions, preferably with the Malvern Mastersizer 2000 Application Firmware Version: 1.06 from Malvern Instruments Ltd.

The metal effect pigments to be used according to the invention in the pigment preparation therefore preferably have an extremely narrow size distribution, therefore an extremely narrow cumulative frequency distribution. Through the narrow size distribution preferred according to the invention, represented as cumulative frequency distribution, the metal effect pigments in the case of flexographic printing have an almost uniform, preferably uniform, transfer or transference behavior during the transfer of the ink from the fountain roller onto the anilox roller to the printing cylinder and finally onto the substrate.

The metal effect pigments to be used according to the invention preferably not only have the above-named narrow size distribution, expressed as cumulative frequency distribution, and a uniform transfer or transference behavior caused thereby, but also have an almost complete, preferably complete, transfer or transference behavior with regard to the extremely small absolute average size $d_{50}$. Because of the almost complete, preferably complete, transfer of the metal effect pigments from the flexographic ink via the fountain roller, the anilox roller and the printing cylinder until printed on the substrate, there is no decrease of the metal effect pigments in the flexographic ink or accumulation of pigment on one of the rollers, rolls or cylinders.

Thus, the pigment preparation according to the invention with metal effect pigments is suitable for continuous and long-lasting flexographic printing processes without resulting in disruptions because of pigment accumulation on a roller, roll or a cylinder or in a pigment decrease in the flexographic ink.

According to the invention, in addition to metal effect pigments, further pigments, for example color pigments, can also be contained in the pigment preparation. The color pigments can be for example conventional fine-particulate, substantially spherical or irregularly shaped colored pigments. These colored pigments usually have a particle size of <1 µm, further preferably of <0.5 µm. Of course, soluble dyes can also be contained in the flexographic ink. In the case of dyes soluble in the flexographic ink, the problem of a decrease of soluble dye in the flexographic ink does not arise.

According to a further preferred variant, in addition to metal effect pigments, the pigment preparation according to the invention contains no further particulate dyes, in particular no pearlescent pigments and/or no colored pigments.

Therefore, in this preferred embodiment, the pigment preparation according to the invention contains metal effect pigments as well as at least one polycarboxylic acid which is preferably covalently bonded to at least one polyglycol ether, as well as optionally further additives and optionally solvents.

According to a preferred variant, the level of metal effect pigments in the pigment preparation according to the invention lies in a range of from 10 to 80 wt.-%, further preferably from 20 to 60 wt.-%, still further preferably from 30 to 55 wt.-%, in each case relative to the total weight of the pigment preparation.

Furthermore, it is preferred for the level of any solvent(s) to lie in a range of from 20 to 90 wt.-%, further preferably from 40 to 80 wt.-%, still further preferably from 45 to 70 wt.-%, in each case relative to the total weight of the pigment preparation.

The level of any further additives in the pigment preparation, per additive, preferably lies in a range of from 0 to 5 wt.-%, preferably from 0.5 to 2.5 wt.-%, in each case relative to the total weight of the pigment preparation.

The pigment preparation is preferably present as flexographic ink. In this case, the pigment preparation additionally contains binders suitable for flexographic printing.

Cellulose derivatives, for example cellulose nitrate, ethyl cellulose, ethyl hydroxyethyl cellulose and/or cellulose acetopropionate, vinyl polymers, for example polyvinyl butyrates, PVC mixed polymers, polyacrylates and/or polymethacrylates, styrene-maleic acid mixed polymers, polyamide resins, polyesters, polyurethanes, ketone resins, malinate resins, shellac or mixtures thereof are preferably used as binders.

The binders are preferably selected from the group which consists of nitrocellulose, ethyl cellulose, polyvinyl butyral (PVB), polyurethanes and mixtures thereof.

In a quite particularly preferred embodiment, a mixture of ethyl cellulose and PVB is selected as binder. Here, the mixing ratio of the two components can lie in the range of from 10:1 to 1:10 parts by weight, preferably from 5:1 to 1:5 parts by weight and quite particularly preferably from 2:1 to 1:2 parts by weight. Flexographic inks according to the invention with a particularly high interlaminar strength were able to be obtained with this binder mixture.

Alcohols, for example ethanol, 2-propanol and/or 1-propanol, glycol ethers, for example methoxy propanol, ethoxy propanol, propylene glycol and/or dipropylene glycol, monomethyl ether, esters, for example methyl acetate, ethyl acetate, isopropyl acetate, propyl acetate, methoxy and/or ethoxy propyl acetate, ketones, for example 2-butanone-4-methyl-2-penthanone, acetone and/or cyclohexanone, aliphatic hydrocarbons, such as for example benzines or mixtures thereof are suitable as solvents for flexographic inks.

The flexographic inks can contain plasticizers, waxes, such as for example polyethylene and/or polypropylene waxes, slip agents, such as for example silicones and/or fatty acid amides, wetting agents, dispersing additives, etc., as further additives.

The flexographic inks can be used for printing on printing substrates, such as for example paper, cardboard, card, metal foil, for example aluminum foil, plastic film, etc. or laminates thereof.

The substrates printed on can preferably be used as a packaging material or as a label.

The pigment preparation according to the invention is suitable in particular for the production of a flexographic ink.

A flexographic ink according to the invention, during the printing, preferably has an efflux time at 25° C. in a DIN 4 beaker which lies in a range of from 15 to 40 s, preferably from 20 to 35 s, further preferably from 25 to 32 s.

According to a preferred variant, the level of metal effect pigments in the flexographic ink according to the invention lies in a range of from 5 to 25 wt.-%, further preferably from 8 to 20 wt.-%, still further preferably from 10 to 16 wt.-%, in each case relative to the total weight of the flexographic ink.

According to a preferred variant, the level of binder in the flexographic ink according to the invention lies in a range of from 1 to 10 wt.-%, further preferably from 1.5 to 8 wt.-%, still further preferably from 2 to 5 wt.-%, in each case relative to the total weight of the flexographic ink.

Furthermore, it is preferred for the level of solvent(s) in the flexographic ink according to the invention to lie in a range of from 50 to 95 wt.-%, further preferably from 70 to 93 wt.-%, still further preferably from 80 to 90 wt.-%, in each case relative to the total weight of the flexographic ink.

The level of any further additives in the flexographic ink, depending on the additive, preferably lies in a range of from 0 to 4 wt.-%, preferably from 0.5 to 2 wt.-%, in each case relative to the total weight of the flexographic ink.

The flexographic ink can be produced by a method in which the pigment preparation according to the invention is introduced into a flexographic ink, for example stirred in or otherwise dispersed. The dispersion takes place until the pigment preparation according to the invention is present uniformly in the flexographic ink.

Alternatively, of course, binders, solvents and any additives can be added to the pigment preparation according to the invention, producing a flexographic ink.

The object forming the basis of the invention is furthermore solved by a method for producing a pigment preparation according to one of claims 1 to 12, wherein the method comprises the following step:
grinding metal grit with a $d_{50,grit}$ of from 0.6 to 2.4 µm and a $d_{90}$ of from 1.6 to 4.3 µm in the presence of at least one polycarboxylic acid with grinding media, obtaining metal effect pigments the average size $d_{50}$ of which lies in a range of from 1.7 to 2.8 µm and the average thickness $h_{50}$ of which lies in a range of from 15 to 50 nm.

According to a further preferred variant of the invention, the metal grit to be used in the method according to the invention has a cumulative frequency distribution with a $d_{50,grit}$ of from 0.8 to 2.2 µm and a $d_{90}$ of from 1.8 to 4.0 µm.

According to a still further preferred variant of the invention, the metal grit to be used in the method according to the invention has a cumulative frequency distribution with a $d_{50,grit}$ of from 1.0 to 2.0 µm and a $d_{90}$ of from 2.0 to 3.8 µm.

The cumulative frequency distribution of the metal grit to be used is measured by means of laser granulometry, preferably with the Helos/BF—Magic device, Version Windox 5.3.0.0, from Sympatec GmbH, Clausthal-Zellerfeld.

The metal grit used in the method according to the invention can be obtained by atomizing liquid metal in an atomizer and then screening the metal grit. The screening can be carried out for example using sieves or cyclones.

The screened metal grit with the above-specified cumulative frequency distribution is then ground in the presence of at least one polycarboxylic acid, which is preferably covalently bonded to at least one polyglycol ether, with grinding media and preferably in the presence of solvents, preferably organic solvent. During the grinding of the metal grit, a mechanical deformation and a comminution of the metal grit particles occur, with platelet-shaped pigments, which are also called metal effect pigments, being obtained.

Grinding balls are preferably used as grinding media. These can consist of stainless steel, ceramic or glass. Ceramic balls are preferably used as grinding media.

The metal grit can be ground in a ball mill, for example a tumbling mill, drum mill or tube mill. According to a preferred variant, a stirred ball mill is used which can be formed as a horizontal or vertical stirred ball mill. In a stirred ball mill, an intensive grinding of the metal grit takes place, in which both a shaping to form very thin metal pigments and a comminution take place, with the platelet-shaped metal pigments according to the invention being obtained.

According to a preferred variant of the invention, the grinding of the metal grit takes place for a period of time which preferably lies between 8 and 125 hours, preferably between 10 and 35 hours, still further preferably between 12 and 25 hours.

The average diameter of the grinding balls preferably lies in a range of from 0.2 to 5.0 mm, further preferably from 0.2 to 4.5 mm, still further preferably from 0.3 to 2 mm.

Preferred variants of the method according to the invention are specified in the dependent claims 18 and 19.

The invention is illustrated with the aid of the following figures and examples, but without being limited thereto.

EXAMPLES

I Production of the Aluminum Effect Pigments

Example 1a

Atomization of Metal Grit

To produce aluminum pigments according to the invention, aluminum was introduced into an induction furnace and melted. Then the molten aluminum was transferred into an induction furnace with a forehearth. The molten aluminum present in liquid form in the forehearth at a temperature of approximately 720° C. was atomized or sprayed vertically upwards through an atomizing nozzle attached to the forehearth. A closed nozzle was used to atomize the molten aluminum. The aluminum particles formed during the atomization solidify and cool in flight. The atomization, which is also called spraying, took place with hot gas at approximately 600° C. being fed in. The hot gas used for the atomization was compressed, then heated in gas heaters and then incorporated into the molten aluminum to be atomized. The aluminum particles were separated out by means of centrifugal force. The powdered aluminum grit separated out there had a $d_{50}$ of <20 μm. The gas-solid separation took place in a filter. The further separation of this aluminum grit took place by further screening steps. This resulted in a very fine powdered aluminum grit produced with a $d_{50,grit}$ of 1.1 μm and a $d_{90,grit}$ of 3.8 μm.

Example 1b

Production of grinding additive (on the basis of EP 1 304 210 A1): 50 g Pripol 1009 (hydrogenated C36 dimer acid from Unichema) and 89 g MPEG 750 (methoxy polyethylene glycol) were weighed out into a glass reaction vessel and heated to 80° C. under $N_2$ protective gas and accompanied by stirring. Then 0.8 g p-toluenesulfonic acid (catalyst) was added and heated to 180° C. Any water of reaction forming was separated out via a water separator. The progress of the reaction was controlled using the acid number. The acid number was determined according to DIN 53402. The reaction was stopped after the acid number reached approximately 24 mg KOH/g additive. This corresponds to a level of esterification of approx. 67%. The average molecular weight of the ester formed was approx. 1750 g/mol.

Example 1c

Grinding

For the wet grinding of the very fine aluminum grit produced according to step a), 1200 g of this metal grit was introduced into a stirred ball mill with 2.5 kg ceramic balls (diameter: 0.6 mm) and 2000 g isopropanol as well as 80 g grinding additive according to Ex. 1b and ground at 1200 rpm for 23 h. The grinding product was separated from the ceramic balls by rinsing with solvent and filtered off via a laboratory nutsche filter. The filter cake was then set to a solids content of 50 wt.-%.

Example 2

Analogous to Example 1, but the grinding time was 18 h.

Example 3

Analogous to Example 1, but during the grinding a phosphoric ester salt with an acid number of from 110 to 140 mg KOH/g (Byk-Chemie, Wesel, Germany) was added and the grinding time was 16 h.

Example 4

For the wet grinding of the very fine aluminum grit produced according to step 1a), 1200 g of this metal grit was introduced into a stirred ball mill with 2.5 kg ceramic balls (diameter: 0.6 mm) and 2000 g isopropanol as well as 80 g grinding additive according to Ex. 1b and ground at 1200 rpm for 10 h. The grinding product was separated from the grinding balls by rinsing with solvent and filtered off via a laboratory nutsche filter. The filter cake was then set to a solids content of 50 wt.-%.

Comparison Example 5

For the wet grinding of the very fine aluminum grit produced according to step 1a), 1200 g of this metal grit was introduced into a stirred ball mill with 2.5 kg ceramic balls (diameter: 0.6 mm) and 2000 g isopropanol as well as 80 g grinding additive according to Ex. 1b and ground at 1200 rpm for 9 h. The grinding product was separated from the grinding balls by rinsing with solvent and filtered off via a laboratory nutsche filter. The filter cake was then set to a solids content of 50 wt.-%.

Comparison Example 6

Analogous to Example 1, but during the grinding a phosphoric ester salt with an acid number of from 110 to 140 mg KOH/g (Byk-Chemie, Wesel, Germany) was added and the grinding time was 33 h.

Example 7

For the wet grinding, instead of the very fine aluminum grit produced according to step 1a), 1200 g of very fine brass grit is introduced into a stirred ball mill with 2.8 kg ceramic balls (diameter: 0.4 mm) and 2100 g isopropanol as well as 70 g grinding additive according to Ex. 1b and ground at 1100 rpm for 15 h. The grinding product was separated from the grinding balls by rinsing with solvent and filtered off via a laboratory nutsche filter. The filter cake was then set to a solids content of 50 wt.-%.

TABLE 1

Overview of pigment sizes and thicknesses of various samples

| Sample | Grinding time in h | $d_{50}$ value/μm | $h_{50}$/nm |
|---|---|---|---|
| Example 1 | 23 | 2.1 | 29 |
| Example 2 | 18 | 2.4 | 31 |
| Example 3 | 16 | 2.6 | 32 |
| Example 4 | 10 | 2.8 | 34 |
| Comparison example 5 | 9 | 3.05 | 36 |
| Comparison example 6 | 33 | 1.2 | 27 |
| Example 7 | 15 | 2.5 | 33 |

Examples 1, 2, 3, 4 and 7 are examples according to the invention

Comparison Example 8

Grinding analogous to Example 2 of EP 2 083 052 B1 A ball mill was filled with 10 g of a dispersion (10 wt.-% pigment) of the commercially available PBVD pigment Metalure® L 55700 (ECKART GmbH, Fürth, Germany), which has a $d_{98}$ value of 21 μm, 1 g Disperbyk 180 (phosphoric acid groups containing dispersant acid number: 95 mgKOH/g additive, amine number: 95 mgKOH/g additive; Byk-Chemie GmbH, Wesel, Germany), 0.2 g octane phosphonic acid and 80 g 1-methoxy-2-propanol.

The mixture was ground with 4 kg ceramic balls with diameters of from 0.3 to 0.7 mm for 1 hour at 750 rpm. The metal pigment obtained had a $d_{50}$ value of approx. 2 μm.

Comparison Example 9

Commercially available Metalure A-41506 (from Eckart GmbH).

Comparison Example 10

Commercially available Ultravario PM-12001 (from Eckart GmbH).

Comparison Example 11

Commercially available Mirrorgold Paste 590 001 (from Eckart GmbH).

II Use of the Pigments from the Examples in Flexographic Inks

The pigments of the examples according to the invention and of the comparison examples were tested for prints in the following testing systems:

a) Flexographic Ink Based on Nitrocellulose 2 g of the commercially available nitrocellulose wool AH09EN (from Hagedorn NC, Germany) and 0.9 g of a commercially available nitrocellulose dosage in SAIB NC AH 27 SAIB (from Hagedorn NC, Germany) were dissolved in 17.6 g ethyl acetate, 1.9 g isopropanol and 23.6 g methoxy propanol. Then 1 g of a commercially available polyurethane binder solution was added.

So much of the pigment preparation was added to this binder medium that a pigment content of 12 wt.-% (aluminum pigments) or 20 wt.-% (gold bronze pigments), in each case relative to the total weight of the ink, results. The thus-obtained inks were set to a printing viscosity of 30 s DIN 4 beaker efflux time before being printed, with methoxy propanol. This resulted in the different pigmentation levels of from 7.2 to 11.9 wt.-% (aluminum pigments) and 15.0 to 18.3 wt.-% (gold bronze pigments) respectively, in each case relative to the total weight of the finished flexographic ink.

b) Flexographic ink based on polyvinyl butyral and ethyl cellulose 1.5 g of a commercially available binder based on ethyl cellulose (from Dow) was dissolved in 15 g ethyl acetate. 1.5 g of a commercially available binder based on polyvinyl butyral (from Kuraray, Germany) was dissolved in 15 g ethanol, 11 g isopropanol and 3 g GB ester (from Silbermann) and added to the solution of ethyl cellulose in ethyl acetate.

So much of the pigment preparation was added to this binder medium that a pigment content of 12 wt.-% (aluminum pigments) or 15 wt.-% (gold bronze pigments), in each case relative to the total weight of the ink, results. The thus-obtained inks were set to a printing viscosity of 30 s DIN 4 beaker efflux time before being printed, with isopropanol. This resulted in the different pigmentation levels of from 6.8 to 10.4 wt.-% (aluminum pigments) and 11.8 to 14.3 wt.-% (gold bronze pigments) respectively, in each case relative to the total weight of the finished flexographic ink.

Generation of the Proofs:

The thus-obtained print-ready inks were printed on a Melinex 401 film (PET film, 50 μm) using an "Erichsen Flexiproof 100" laboratory proofer (ruling 80 l/cm, cell volume 13 cm³/m²). The following parameters were determined with reference to these proofs:

Optical Evaluation:

The prints were characterized optically on the back side by a gloss measurement at 60° on the basis of DIN 67 530 (device: micro-Tri-gloss from Byk-Gardner, Geretsried, Germany). Calibration here was by means of dark calibration and a sheet of black polished plate glass with values of 92 for 60°.

Evaluation of the Coverage/Transfer Behavior:

The coverage was ascertained by means of a Techkon RT-120 transmission-densitometer and a Techkon LP-40 light plate (both from Techkon, Königstein, Germany) (T-Den mode). The higher the measured value is, the better the coverage is.

Evaluation of the Print Graininess and the Color Values:

The prints were measured with the aid of a BYK-mac spectrophotometer (Byk-Gardner, Geretsried, Germany). A crucial factor for the print graininess is the "grainity" value. If this is low, then the print is very uniform and by eye is considered to be of higher quality than a print with a higher value.

In addition, the color values were measured and evaluated in the LAB system. In the case of gold bronze pigments, the b* value in particular is interesting. In the case of higher b* values, the print appears to be more intensely yellow than in the case of a comparatively lower value.

Evaluation of the Interlaminar Strength of the Printed Ink:

To examine the interlaminar strength between pigment and binder, an adhesive strip was adhered fixedly and bubble-free to the surface after complete hardening of the ink. Then this adhesive strip was peeled off again, so that the background was not damaged. The interlaminar strength was assessed visually using a grading system on the basis of DIN EN ISO 4628-1. A poor interlaminar strength is reflected in a correspondingly strong tearing from the print.

TABLE 1

Results of proofs based on NC (aluminum pigments)

Flexographic ink based on nitrocellulose

| Sample | Pigmentation in wt.-% | Gloss | Coverage | Interlaminar strength | Graininess |
|---|---|---|---|---|---|
| Example 1 | 11.6 | 448 | 1.1 | very good (0) | 3.1 |
| Example 2 | 11.9 | 458 | 1.1 | good (1) | 3.4 |
| Example 3 | 10.7 | 460 | 1.0 | good (1) | 3.7 |
| Comparison example 5 | 10.2 | 411 | 0.6 | less good (3) | 7.2 |
| Comparison example 6 | 10.5 | 328 | 0.8 | very good (0) | 5.2 |
| Comparison example 8 | 8.4 | 365 | 0.6 | less good (3) | 7.6 |
| Comparison example 9 | 7.2 | 530 | 0.7 | very good (0) | 7.5 |
| Comparison example 10 | 8.0 | 404 | 0.5 | less good (3) | 8.1 |

TABLE 2

Results of proofs of flexographic ink based on PVB/EC (aluminum pigments)

Flexographic ink based on ethyl cellulose and polyvinyl butyral

| Sample | Pigmentation in wt.-% | Gloss | Coverage | Interlaminar strength | Graininess |
|---|---|---|---|---|---|
| Example 1 | 9.8 | 448 | 1.4 | very good (0) | 3.0 |
| Example 2 | 10.3 | 458 | 1.5 | very good (0) | 2.6 |
| Example 3 | 10.2 | 460 | 1.5 | good (1) | 2.7 |
| Example 4 | 10.4 | 499 | 1.8 | still good (2) | 2.2 |
| Comparison example 5 | 10.4 | 503 | 1.6 | less good (3) | 2.0 |
| Comparison example 8 | 9.3 | 365 | 0.8 | poor (4) | 6.7 |
| Comparison example 9 | 6.8 | 513 | 0.5 | very good (0) | 10.0 |
| Comparison example 10 | 7.4 | 404 | 0.6 | very good (0) | 9.7 |

The results for the aluminum pigments represented in the two tables illustrate the advantages of the pigments according to the invention and of the printing inks according to the invention produced using these pigments. Examples 1-4 (examples according to the invention) show excellent gloss values, very good coverages, a good interlaminar strength and an extremely uniform print in both systems.

The pigments of the comparison examples were comparable to the pigments of the examples according to the invention in individual properties, but the pigments of the comparison examples always failed in at least one property, unlike the pigments of the examples according to the invention.

Thus, although the pigments of comparison example 5 displayed an excellent gloss and also a good coverage in the flexographic ink based on PVB/EC, in the pigments of this example the adhesion is less good than in the pigments according to the invention. In the case of use in flexographic inks based on NC, the pigments of comparison example 5 displayed a much lower gloss and lower coverage than the pigments according to the invention.

In the flexographic ink based on NC, the pigments of comparison example 6 likewise have much lower coverage and lower gloss than the pigments according to the invention.

The pigments of the further comparison examples 8-10 all display, in both color systems, a much poorer transfer and therefore a much lower coverage than the pigments according to the invention. Because of this poor transfer, the print also becomes non-uniform, which is expressed in the very high—compared with the pigments and inks according to the invention—graininess.

TABLE 4

Results of proofs based on PVB/EC (gold bronze pigments)

Flexographic ink based on polyvinyl butyral and ethyl cellulose

| Sample | Pigmentation | Gloss | Coverage | b (25°) | b (45°) |
|---|---|---|---|---|---|
| Example 7 | 14.3 | 223 | 0.6 | 20.0 | 11.7 |
| Comparison example 11 | 11.8 | 224 | 0.3 | 14.7 | 6.8 |

TABLE 5

Results of proofs based on NC (gold bronze pigments)

Flexographic ink based on nitrocellulose

| Sample | Pigmentation | Gloss | Coverage | b (25°) | b (45°) |
|---|---|---|---|---|---|
| Example 7 | 18.3 | 265 | 0.7 | 13.4 | 6.7 |
| Comparison example 11 | 15.0 | 244 | 0.4 | 9.8 | 12.3 |

The advantages of the pigments according to the invention are also apparent in the gold bronze pigments. The prints were of higher coverage and had a gloss equal to or even higher than the comparison proofs. In addition, the prints of the pigments according to the invention had a more intense yellow color (higher b* value). Because of the better coverage and the more intensely yellow color shade with at least constant gloss, the prints have a much higher-quality effect on the observer than the prints of the comparison example.

The invention claimed is:

1. A pigment preparation comprising metal effect pigments, wherein
the metal effect pigments have an average size $d_{50}$ in a range of 1.7 to 2.8 µm and an average thickness $h_{50}$ in a range of 15 to 50 nm, as well as at least one polycarboxylic acid, wherein the at least one polycarboxylic acid has at least 4 carbon atoms.

2. The pigment preparation comprising metal effect pigments according to claim 1, wherein
the metal effect pigments are produced by wet grinding.

3. The pigment preparation comprising metal effect pigments according to claim 1, wherein
the metal effect pigments have an average thickness $h_{50}$ in the range of 20 to 40 nm.

4. The pigment preparation comprising metal effect pigments according to claim 1, wherein
the metal effect pigments have an average size $d_{50}$ in the range of 1.9 to 2.8 µm.

5. The pigment preparation comprising metal effect pigments according to claim 1, wherein
the metal effect pigments have an average size $d_{50}$ in the range of 2.1 to 2.8 µm.

6. The pigment preparation comprising metal effect pigments according to claim 1, wherein
the metal effect pigment comprises at least one metal selected from the group consisting of aluminum, aluminum alloys, copper, copper alloys and brass and iron.

7. The pigment preparation comprising metal effect pigments according to claim 6, wherein
the metal effect pigment consists of aluminum or aluminum alloy(s).

8. The pigment preparation comprising metal effect pigments according to claim 1, wherein
the at least one polycarboxylic acid is covalently bonded to at least one polyglycol ether.

9. The pigment preparation comprising metal effect pigments according to claim 1, wherein
the pigment preparation additionally comprises at least one dispersing additive structurally different from the polycarboxylic acid.

10. The pigment preparation comprising metal effect pigments according to claim 1, wherein
the metal effect pigments have a cumulative frequency distribution with a $d_{50}$ value in a range of 2.1 to 2.8 µm and a $d_{90}$ value in a range of 4.0 to 8.0 µm.

11. The pigment preparation comprising metal effect pigments according to claim 1, wherein
the level of metal effect pigments lies in a range of 10 to 90 wt.-%, relative to the total weight of the pigment preparation.

12. The pigment preparation comprising metal effect pigments according to claim 1, wherein
the pigment preparation is present as a flexographic ink.

13. An ink comprising the pigment preparation according to claim 1.

14. A flexographic ink comprising the pigment preparation according to claim 1.

15. The flexographic ink according to claim 14, wherein
the flexographic ink further comprises at least one solvent and has a viscosity of an efflux time at 25° C. in a DIN 4 beaker in the range of 15 to 40 s.

16. The flexographic ink according to claim 14, wherein
the flexographic ink further comprises a mixture of ethyl cellulose and polyvinyl butyral as binder.

17. A method for producing a pigment preparation comprising:
grinding metal grit with a $d_{50,grit}$ of 0.6 to 2.4 µm and a $d_{90}$ of 1.6 to 4.3 µm in the presence of at least one polycarboxylic acid, which has at least 4 carbon atoms, with grinding media, obtaining metal effect pigments having an average size $d_{50}$ in the range of 1.7 to 2.8 µm and an average thickness $h_{50}$ in the range of 15 to 50 nm.

18. The method of producing a pigment preparation according to claim 17, wherein
the metal grit is ground in a stirred ball mill.

19. The method of producing a pigment preparation according to claim 17, wherein
at least one dispersing additive structurally different from the polycarboxylic acid is additionally added.

20. A flexographic print prepared from the flexographic ink according to claim 14.

* * * * *